(12) United States Patent
Nishiyama

(10) Patent No.: US 11,808,579 B2
(45) Date of Patent: Nov. 7, 2023

(54) AUGMENTED REALITY BASED TIDAL CURRENT DISPLAY APPARATUS AND METHOD

(71) Applicant: Furuno Electric Co., Ltd., Hyogo (JP)

(72) Inventor: Koji Nishiyama, Ibaraki (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 279 days.

(21) Appl. No.: 17/451,071

(22) Filed: Oct. 15, 2021

(65) Prior Publication Data
US 2022/0268586 A1 Aug. 25, 2022

(30) Foreign Application Priority Data

Feb. 19, 2021 (EP) .................................. 21158107
May 13, 2021 (JP) .............................. 2021-081346

(51) Int. Cl.
*G01C 21/20* (2006.01)
*G06T 19/00* (2011.01)
(Continued)

(52) U.S. Cl.
CPC ........ *G01C 21/203* (2013.01); *G01C 21/3867* (2020.08); *G06T 7/73* (2017.01);
(Continued)

(58) Field of Classification Search
CPC .... G01C 21/203; G01C 21/3867; G06T 7/73; G06T 19/003; G06T 19/006
See application file for complete search history.

(56) References Cited

U.S. PATENT DOCUMENTS

2012/0282064 A1* 11/2012 Payne .................. F03B 13/264
414/803
2014/0240313 A1 8/2014 Varga
(Continued)

FOREIGN PATENT DOCUMENTS

JP  2019121876 A   7/2019
WO 2018216535 A1  11/2018

OTHER PUBLICATIONS

Wisernig, E. et al., "Augmented Reality Visualization for Sailboats (ARVS)", Proceedings of the 2015 International Conference on Cyberworlds (CW), IEEE, Oct. 7, 2015, Visby, Sweden, 8 pages.
(Continued)

*Primary Examiner* — Seth A Silverman
(74) *Attorney, Agent, or Firm* — Alleman Hall Creasman & Tuttle LLP

(57) ABSTRACT

An augmented reality based tidal current display device for superimposing tidal current information on an image displayed on a display screen includes an image information terminal configured to receive the image captured by an image sensor, and output image data for displaying on the display screen; an image sensor information terminal configured to receive and store image sensor information of the image sensor; a tidal current information terminal configured to receive and store tidal current information of the water surface; and processing circuitry configured to: select tidal currents, calculate a corresponding display position and direction of each selected tidal current on the display screen based on the tidal current information and the image sensor information, generate a symbol to indicate the corresponding display position and direction on the display screen, and superimpose the symbol at a respective display position to the corresponding display position on the image.

20 Claims, 9 Drawing Sheets

(51) Int. Cl.
*G06T 7/73* (2017.01)
*G01C 21/00* (2006.01)

(52) U.S. Cl.
CPC .......... *G06T 19/003* (2013.01); *G06T 19/006* (2013.01); *G06T 2207/30181* (2013.01)

(56) References Cited

U.S. PATENT DOCUMENTS

2015/0347852 A1   12/2015   Laaksonen
2017/0003128 A1*  1/2017    Kono ...................... G01W 1/00
2020/0090414 A1*  3/2020    Nishiyama ............... G08G 3/02

OTHER PUBLICATIONS

Wisernig, E. et al., "Augmented Reality Visualization for Sailboats (ARVS)," Proceedings of the 2015 International Conference on Cyberworlds, Oct. 7, 2015, Visby, Sweden, 8 pages.

* cited by examiner

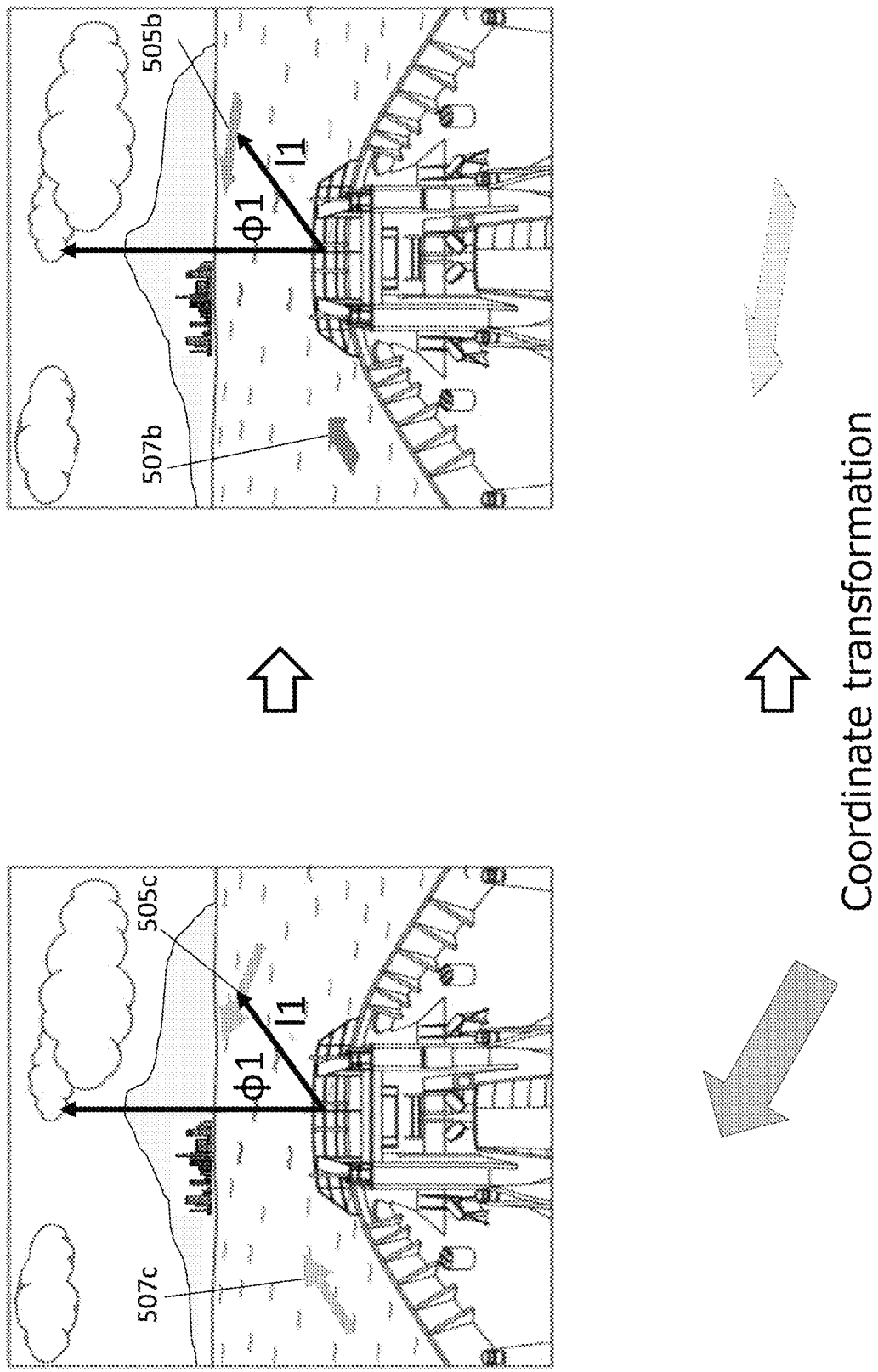

AUGMENTED REALITY BASED TIDAL CURRENT DISPLAY APPARATUS AND METHOD

CROSS-REFERENCE TO RELATED APPLICATIONS

The application claims priority under 35 U.S.C. § 119 to European Patent Application No. EP21158107.9, which was filed on Feb. 19, 2021, and Japanese Patent Application No. JP 2021-081346, which was filed on May 13, 2021, and the entire disclosures each of which are hereby incorporated by reference.

BACKGROUND

Technical Field

The present disclosure mainly relates to an augmented reality based tidal current display apparatus, and more specifically to superimposing tidal current information on an image for navigation of a water vessel.

Background of the Related Art

Tidal currents have been known to influence a course of the marine vessel on water. Vessel navigating personnel, for example, a captain, crew, or other navigating personnel on-board the marine vessel may be unaware of when and how each tidal current may influence the course of the marine vessel. For example, in waters where tidal currents may, or stated differently—are likely to, be encountered by the marine vessel, a position, direction and/or speed of the tidal current may be unknown by the vessel navigating personnel and consequently, the vessel navigating personnel may be forced to choose or elect a sub-optimal course of travel for the marine vessel in such waters. Depending on a severity of, or by simply encountering over a prolonged period of time, these tidal currents may contribute in negatively impacting a structural integrity and/or an operational performance of the marine vessel.

Some systems have been developed in the past to assist in the navigation of marine vessels. Usually, a geographical chart showing a chart of a predetermined area and a tidal current at each location within an area is provided from an external base through communication equipment. The information indicating the tidal current generally includes the measuring position and the direction and speed of the tidal current at the measuring position. A ship navigating in the above area can obtain information on the tidal current by using a communication means such as satellite communication. The obtained information is displayed on the navigation monitor of a vessel to help determine the vessel route. However, many of these systems have mostly relied on on-board equipment for sensing various parameters associated with the surroundings of the marine vessel. Nevertheless, it is complex, challenging, and sometimes even impossible to detect or measure aspects such as tidal currents using such on-board equipment. In fact, such on-board equipment may not be simple, yet reliable, for use in the detection or measurement of aspects of the surroundings such as tidal currents.

Conventional Augmented Reality (AR) based navigation systems can display image information captured by an image sensor (camera) and information about surrounding ships and land acquired based on information captured by a sensor such as a radar, however, it is difficult to display the tidal current information by the conventional AR navigation system because the tidal current information is not obtained by the sensor of the own vessel except around the own vessel, but obtained from an external base through communication equipment. There does not exist an AR based navigation system that is able to display tidal current information provided from other than one's own vessel on an AR display screen.

For the aforementioned reasons, there is a need for providing a system and method that takes into account tidal currents and their potential impacts on the marine vessel for assisting in the navigation of the marine vessel.

SUMMARY

In an embodiment of the present disclosure, there is provided an augmented reality (AR) based tidal current display apparatus for superimposing tidal current information on an image displayed on a display screen. The AR based tidal current display apparatus includes an image sensor information terminal configured to receive and store image sensor information including a position and an azimuthal orientation of an image sensor attached to a movable body on a water surface. The AR based tidal current display apparatus further includes a tidal current information terminal configured to receive and store tidal current information including positions and directions of tidal currents on the water surface (W), detected by outside the movable body. The AR based tidal current display apparatus further includes a tidal current selection unit configured to select one or more tidal currents located in a field of view of the image sensor. The AR based tidal current display apparatus further includes a position calculation unit configured to, for each selected tidal current, calculate a corresponding display position and direction on the display screen based on the tidal current information and the image sensor information, and a tidal current superimposition unit configured to generate a symbol for each selected tidal current to indicate each display position on the display screen, and output each symbol to the display screen.

Additionally, or optionally, the AR based tidal current display apparatus further includes an image information terminal configured to receive image captured by the image sensor, and output image data for displaying on the display screen, and the tidal current superimposition unit is further configured to superimpose each symbol at respective display position on an image displayed on the display screen based on the image data.

Additionally, or optionally, the AR based tidal current display apparatus further comprises a chart information terminal configured to receive and store chart information indicating a chart of a region including the movable body, and the tidal current selection unit is further configured to: receive a chart of a region including the movable body from the chart information receiving terminal, determine a sub-region in the received chart based on the position and azimuthal orientation of the image sensor, wherein the sub-region has a reference axis in relation to a heading direction of the movable body, and select the one or more tidal currents located in the sub-region.

Additionally, or optionally, the position calculation unit includes a local coordinate transformation unit configured to receive chart coordinates of the tidal current to corresponding local coordinates based on the position and the azimuthal orientation of the image sensor, wherein a chart coordinate is a position on the chart, and a local coordinate is a position in the sub-region.

Additionally, or optionally, the position calculation unit further includes a display coordinate transformation unit configured to receive and convert local coordinates of the tidal current to corresponding display coordinates based on the image sensor information, wherein a display coordinate correspond to a display position on the display screen.

Additionally, or optionally, the local coordinate transformation unit is configured to receive a speed associated with each selected tidal current from the tidal current selection unit and determine a speed associated with each selected tidal current in the sub-region based on the position and the azimuthal orientation of the image sensor, and the display coordinate transformation unit is configured to receive the direction and speed of each selected tidal current in the sub-region, calculate a direction of each selected tidal current on an image displayed on the display screen, based on a height (h) of the image sensor from the water surface (W), a depression angle ($\alpha$) of the image sensor and a viewing angle ($\beta$) of the image sensor.

Additionally, or optionally, the tidal current superimposition unit is further configured to generate a symbol indicating at least one of: a speed of respective tidal current on the image at respective display position, and output each symbol to the display screen.

Additionally, or optionally, the tidal current superimposition unit is further configured to output the symbol for indicating current speed of each tidal current for displaying on at least one of: a sub-display on the display screen, and an external display screen.

Additionally, or optionally, the tidal current superimposition unit is further configured to predict one or more future display positions of one or more selected tidal currents on an image displayed on the display screen, generate one or more symbols corresponding to the one or more predicted future positions and directions, and superimpose the one or more symbols on the image displayed on the display screen.

In another aspect of the present disclosure, there is provided an augmented reality (AR) navigation apparatus, for superimposing tidal current information on an image displayed on a display screen. The AR navigation apparatus includes an image sensor attached onto the movable body configured to capture the image and output image data, an image sensor information terminal configured to receive and store image sensor information including a position and an azimuthal orientation of the image sensor attached to the movable body on a water surface, and a chart information terminal configured to receive and store chart information indicating a chart of the region including the movable body. The AR navigation apparatus further includes a tidal current information terminal configured to receive and store tidal current information including positions and directions of tidal currents on the water surface (W), detected by outside the movable body, pertaining to one or more locations in the chart, and a tidal current selection unit configured to determine a sub-region in the region of the chart based on the image sensor information, and select one or more tidal currents located in the sub-region. The AR navigation apparatus further includes a position calculation unit configured to calculate a display position and direction of each selected tidal current on the display screen based on the tidal current information and the image sensor information, and a tidal current superimposition unit configured to generate a symbol for each selected tidal current corresponding to each display position and direction, and superimpose each symbol at the each display position on the image displayed on the display screen based on the image data.

Additionally, or optionally, the augmented reality navigation apparatus further includes the display screen configured to display the image, based on the image data and display the symbols superimposed on the image.

In yet another aspect of the present disclosure, there is provided a method for superimposing tidal current information on an image displayed on a display screen. The method includes receiving and storing image data based on the image captured by an image sensor, receiving and storing image sensor information including a position and an azimuthal orientation of the image sensor attached to a movable body on a water surface (W), receiving and storing chart information indicating a chart of the region including the movable body, receiving and storing tidal current information including positions and directions of tidal currents on the water surface (W), detected by outside the movable body, pertaining to one or more locations in the chart, determining a sub-region in the region of the chart based on the image sensor information, selecting one or more tidal currents located in the sub-region, calculating a display position and direction of each selected tidal current on the display screen based on the tidal current information and the image sensor information, generating a symbol for each selected tidal current corresponding to each display position and direction, and superimposing each symbol at the each display position on the image displayed on the display screen based on the image data.

In yet another aspect of the present disclosure, there is provided a non-transitory computer readable medium having stored thereon computer-executable instructions which, when executed by a computer, cause the computer to receive and store image data based on the image captured by an image sensor, receive and store image sensor information including a position and an azimuthal orientation of the image sensor attached to a movable body on a water surface, receive and store chart information indicating a chart of the region including the movable body, receive and store tidal current information including positions and directions of tidal currents on the water surface (W), detected by outside the movable body, pertaining to one or more locations in the chart, determine a sub-region in the region of the chart based on the image sensor information, select one or more tidal currents located in the sub-region, calculate a display position and direction of each selected tidal current on the display screen based on the tidal current information and the image sensor information, generate a symbol for each selected tidal current corresponding to each display position and direction, and superimpose each symbol at the each display position on the image displayed on the display screen based on the image data.

BRIEF DESCRIPTION OF DRAWINGS

The illustrated embodiments of the subject matter will be best understood by reference to the drawings, wherein like parts are designated by like numerals throughout. The following description is intended only by way of example, and simply illustrates certain selected embodiments of apparatuses, systems, and processes that are consistent with the subject matter.

FIG. 5C illustrates generation of three dimensionally transformed symbols for superimposing on the image generated by the image sensor.

DETAILED DESCRIPTION

Figure 1:
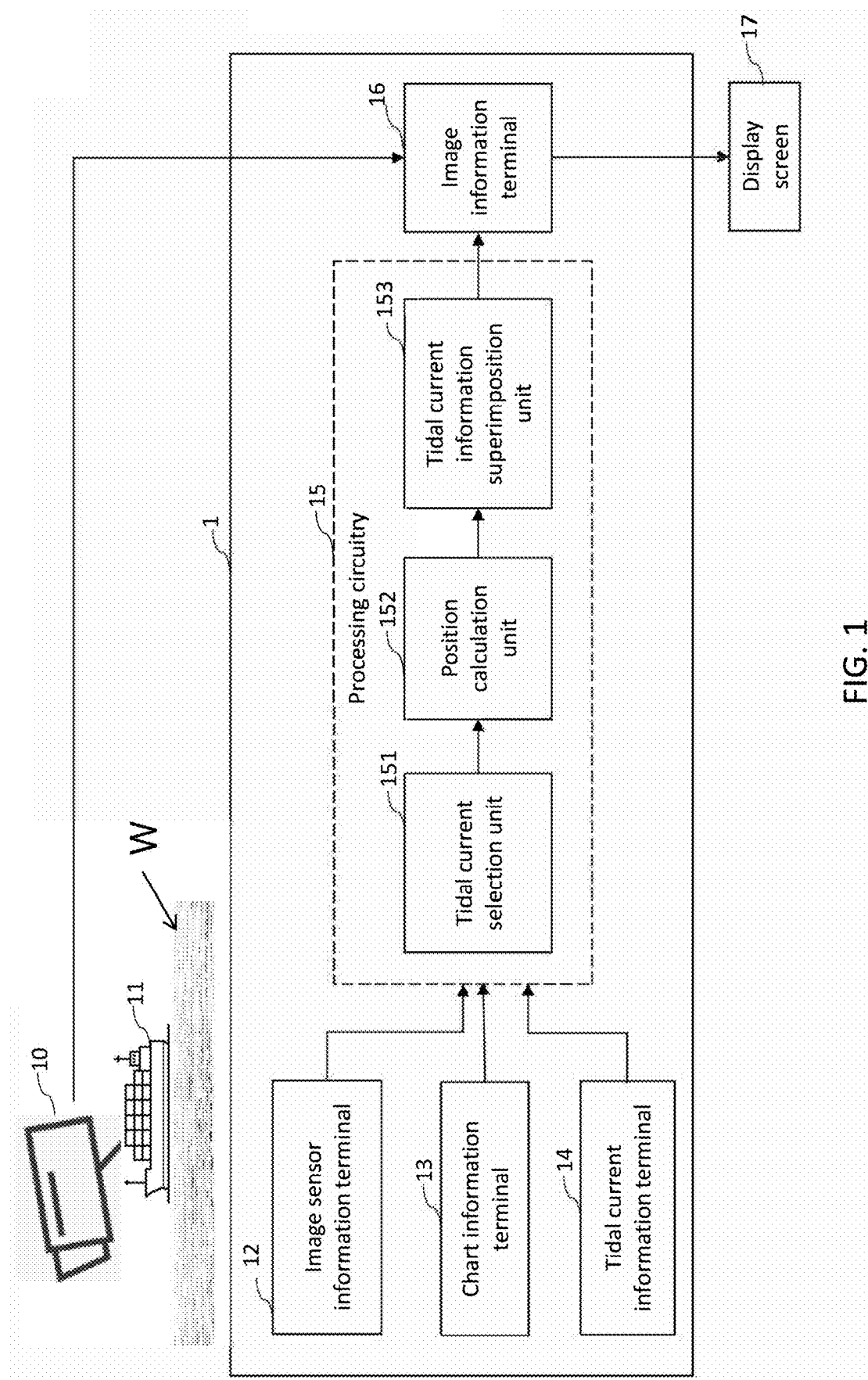
FIG. 1 is a block diagram illustrating an entire configuration of an Augmented Reality (AR) based tidal current display apparatus in which an image sensor is attached to a movable body according to one embodiment of the present disclosure.

Example apparatus are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Figure 2A:
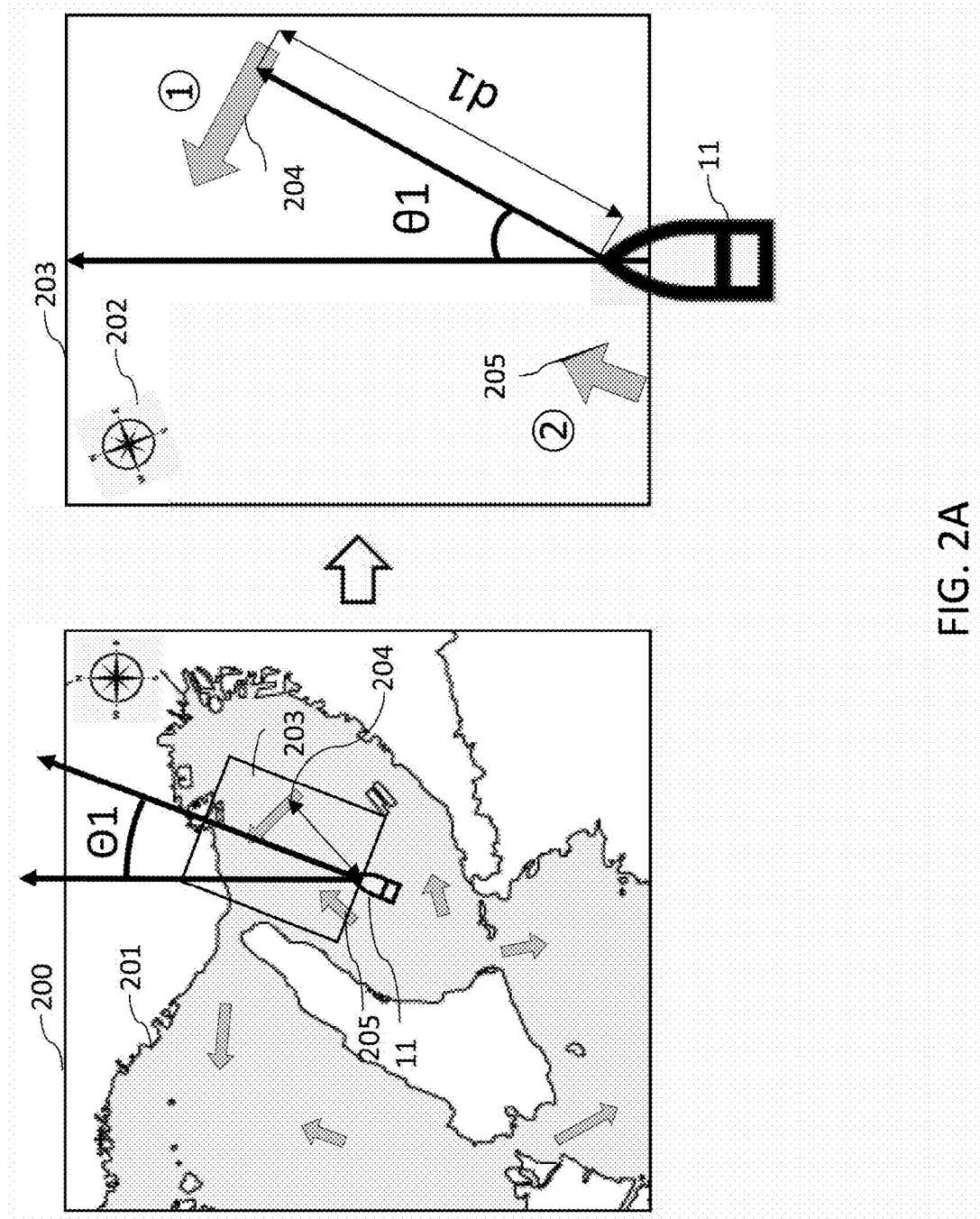
FIG. 2A illustrates a chart of a region including the movable body, and a sub-region in the chart.
Figure 2B:
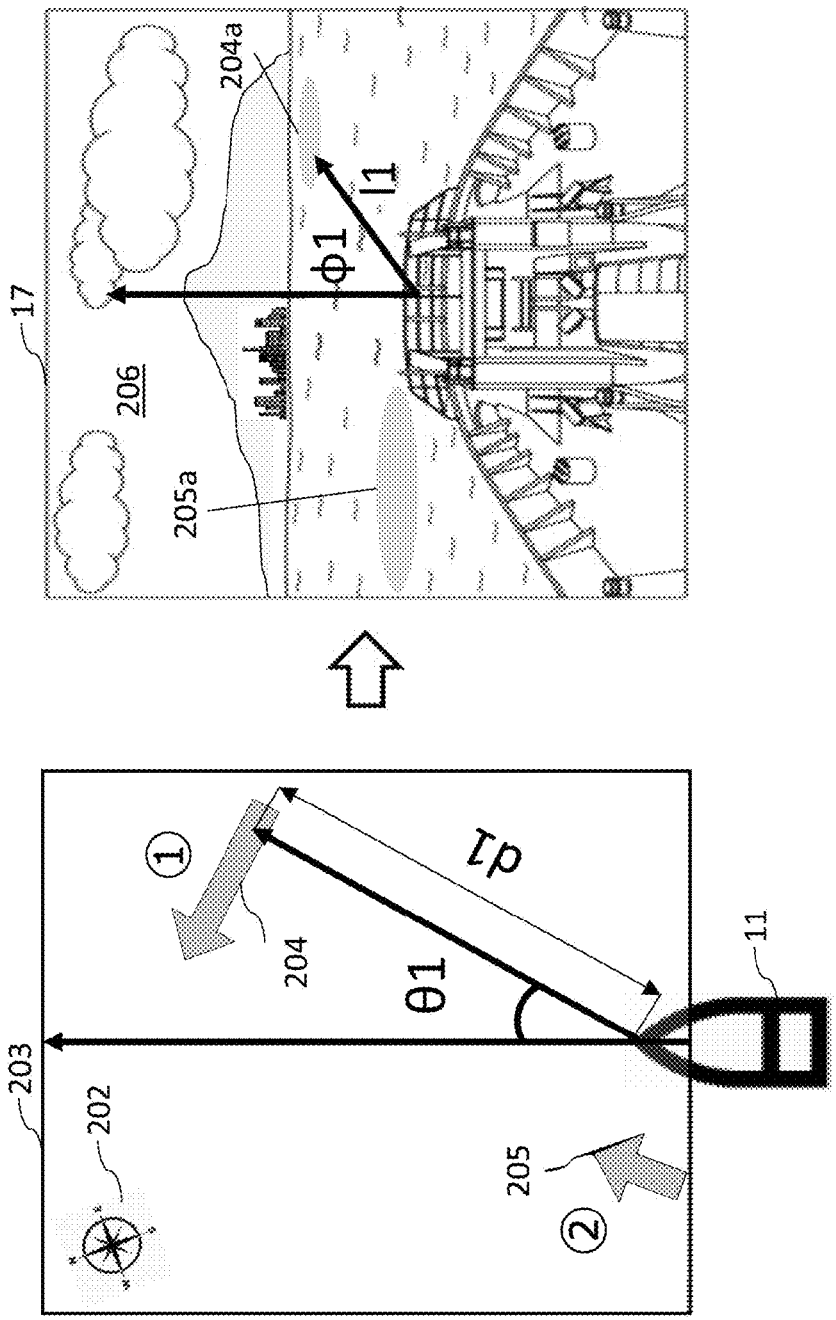
FIG. 2B illustrates the superimposing of tidal current information on an image captured by the image sensor.

FIG. 1 is a block diagram illustrating an entire configuration of an augmented reality (AR) based tidal current display apparatus 1 in which an image sensor 10 is attached to a movable body 11 according to one embodiment of the present disclosure. FIG. 2A illustrates a chart 200 of a region 201 including the movable body 11, and a sub-region 203 in the chart 200 that has a reference axis with respect to a heading direction of the movable body 11. FIG. 2B illustrates the superimposing of tidal current information on an image captured by the image sensor 10.

Next, mainly referring to FIG. 1, the image sensor 10 (hereinafter also referred to as camera 10) may be attached to the movable body 11 (hereinafter also referred to as ship 11, and electrically connected to the display apparatus 1.

The tidal current display apparatus 1 of this embodiment may be located on-board the ship 11 and provided in electrical connection to the camera 10 as the ship instrument for purposes as will be explained in detail later herein.

The camera 10 may be configured as, for example, a limited-viewing angle or a wide-angle video camera which images the water surface W in the vicinity, or around at least a portion of the perimeter of the ship 11. This camera 10 may have a live output function, capable of generating video data (image data) as the imaged result on real time, and outputting it to a display screen 17. As illustrated in FIG. 1, the camera 10 may be installed in the ship 11 so that an imaging direction generally faces onto the water surface W forward of the hull.

The camera 10 may be attached to the ship 11 through a rotating mechanism (not illustrated) and, therefore, the imaging direction can be changed in a given angle range on the basis of the hull of the ship 11 by inputting a signal for instructing pan/tilt from the display apparatus 1. Moreover, as the height and the posture of the ship 11 may change due to waves etc., the height h of the camera 10 may change with respect to the water surface W.

The AR based tidal current display apparatus 1 may be communicatively coupled to the display screen 17 for generating an image expressing the situation around the movable body 11 using AR based on, among other things, a position and azimuthal orientation of the camera 10.

The display screen 17 may be configured as, for example, a display screen that forms part of a navigation assisting apparatus to which a ship operator who operates the ship 11 refers. However, the display screen 17 is not limited to the above configuration, and, for example, it may be a display screen for a portable computer which is carried by a ship operator's assistant who monitors the surrounding situation from the ship 11, a display screen for a passenger to watch in the cabin of the ship 11, or a display part for a head mounted display, such as a wearable glass, worn by a passenger. In an embodiment of the present disclosure, the camera 10 and display screen 17 are external to the display apparatus 1. In another embodiment of the present disclosure, the camera 10, and the display screen 17 are an integral part of the display apparatus 1. Additionally, or optionally, the image sensor 10, the display screen 17 and the AR based tidal current display apparatus 1, together forms an AR based navigation apparatus for facilitating a user to navigate the ship 11 across the sea.

The AR based tidal current display apparatus 1 may also be connected to variety of peripheral apparatuses including, but not limited to, a keyboard and a mouse which the user may operate for performing various functions consistent with the present disclosure. For example, the user can provide various kinds of instructions to the AR based tidal current display apparatus 1 and the camera 10 about generation of an image by operating the keyboard and/or the mouse. The instructions may include the pan/tilt operation of the camera 10, setting of displaying or not-displaying of various types of information, and a setup of a viewpoint from which the image is captured.

Next, a configuration of the AR based tidal current display apparatus 1 is described in detail mainly referring to FIG. 1. The AR based tidal current display apparatus 1 includes an image sensor information terminal 12, a chart information terminal 13, a tidal current information terminal 14, a processing circuitry 15, and an image information terminal 16. The image information terminal 16 is configured to receive an image captured by the image sensor 10, and output the image data to the display screen 17.

Figure 3:
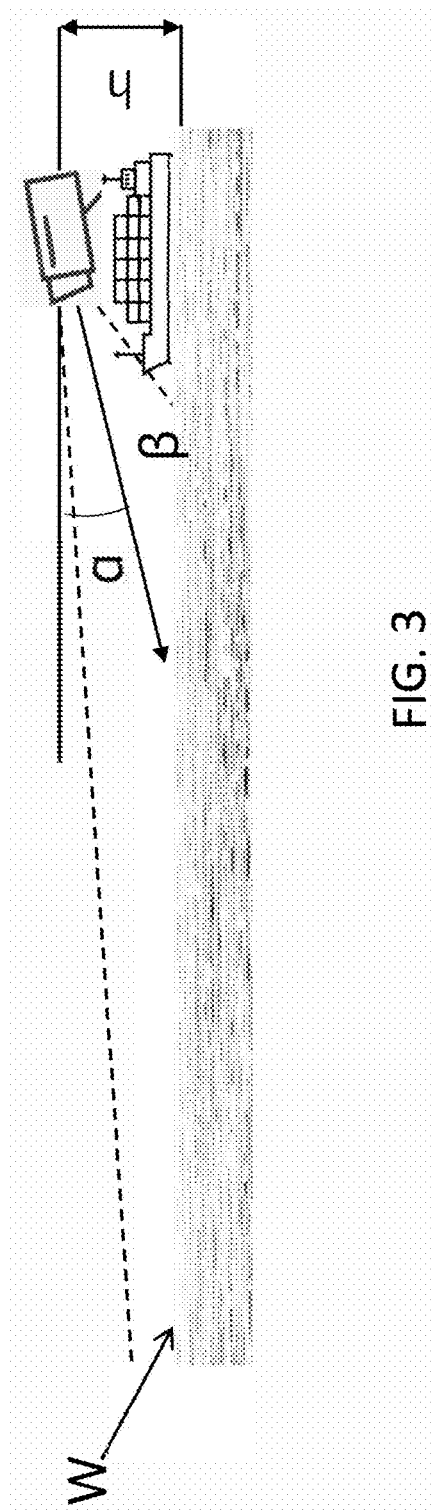
FIG. 3 is a side view illustrating a height of the image sensor from the water surface, a depression angle of the image sensor and a viewing angle of the image sensor.

The image sensor information terminal 12 is configured to receive and store image sensor information including a position and an azimuthal orientation of the image sensor 10 with respect to a reference axis of a global geographical chart. As shown in FIG. 3, the image sensor information may further include a height (h) of the image sensor 10 from the water surface (W), a depression angle ($\alpha$) of the image sensor 10 and a viewing angle ($\beta$) of the image sensor 10. The image sensor 10 is fixedly attached to the ship 11, and therefore, the position of the image sensor 10 on the chart 200 is assumed to be similar to a position of the ship 11 in the chart 200, and a heading direction of the ship 11 is used to determine the azimuthal orientation of the image sensor 10, and vice versa.

Referring back to FIG. 1, the chart information terminal 13 is configured to receive and store the geographical chart 200 of the region 201 including the ship 11 based on electronic nautical chart information stored beforehand. The tidal current information terminal 14 is configured to receive and store tidal current information including positions and directions of tidal currents on the water surface (W) including positions and directions of tidal currents on the water surface (W). The tidal current information is detected by outside the movable body, because it is difficult to obtain the tidal current information with measuring devices attached on an own vessel. Therefore, the tidal current information is obtained through an external communication equipment, for example, a land station, a Global Navigation Satellite System (GNSS) receiver, an Electronic Chart Display and Information System (ECDIS), an Automated Identification System (AIS) receiver, a radar apparatus etc.

The tidal current information may further include speeds of the tidal currents. The tidal current information terminal 14 is generally configured to store tidal current information of tidal currents of the region 201 including the ship 11. The tidal current information terminal 14 is configured to store the tidal current information with respect to a reference axis of the chart 200, which means that the tidal current information terminal 14 is configured to store chart/global coordinates of the tidal currents in the region 201.

Referring to FIGS. 1, 2A and 2B, the processing circuitry 15 includes a tidal current selection unit 151 that selects one or more tidal currents 204 and 205 located in a field of view of the image sensor 10 based on the tidal current information, a position calculation unit 152 that calculates a corresponding display position and direction of each selected tidal current 204 and 205 on the display screen 17 based on the tidal current information and the image sensor information, and a tidal current information superimposition unit 153 that generates symbols 204a and 205a for each selected tidal current 204 and 205 to indicate position of each tidal current 204 and 205 on an image 206 displayed on the display screen 17. As shown, each of the symbols 204a and 205a is configured in the shape of a circular marker for indicating position of corresponding tidal currents 204 and 205 on the image 206. Although, the symbols 204a and 205a are shown to be circular markers, it would be apparent to one of ordinary skill in the art, that the symbols 204a and 205a may include other configurations such as elliptical or square markers to indicate the positions of respective tidal currents on the image 206 displayed on the display screen 17.

The tidal current superimposition unit 153 outputs the symbols 204a and 205a to the display screen 17 to superimpose the symbols 204a and 205a on the image 206 captured by the image sensor 10 and display the superimposed image to provide visual information about positions of the tidal currents 204 and 205 with respect to sea surface, and in a manner which is easy for a user to comprehend.

In the context of the present disclosure, the processing circuitry 15 includes a processor, computer, microcontroller, or other circuitry that controls the operations of various components such as the operation panel, and the memory. The processing circuitry 15 may execute software, firmware, and/or other instructions, for example, that are stored on a volatile or non-volatile memory, or otherwise provided to the processing circuitry 15.

Referring FIGS. 1, 2A and 3 together, the tidal current selection unit 151 receives the image sensor information, chart information and tidal current information from the image sensor information terminal 12, chart information terminal 13, and the tidal current information terminal 14 respectively. The tidal current selection unit 151 operably selects one or more tidal currents 204 and 205 located in a field of view 203, or stated differently, a viewing angle (β) of the image sensor 10. More specifically, the tidal current selection unit 151 receives the chart 200 of the region 201 surrounding the movable body 11, determines the sub-region 203 based on the position and azimuthal orientation of the image sensor 10, and selects the first and second tidal currents 204 and 205 in the sub-region 203 based on the tidal current information.

Although two selected tidal currents are shown herein, it would be apparent to one of ordinary skill in the art that the tidal current selection unit 151 may select more than or less than two tidal currents.

Referring to FIGS. 1, 2A, 2B, 3, and 4, the position calculation unit 152 is configured to calculate a position of each selected tidal current 204 and 205 to be displayed on the display screen 17 based on the image sensor information and the tidal current information. More specifically, the position calculation unit 152 is configured to calculate display coordinates of the first and second tidal currents 204 and 205 for displaying on the display screen 17.

Figure 4:
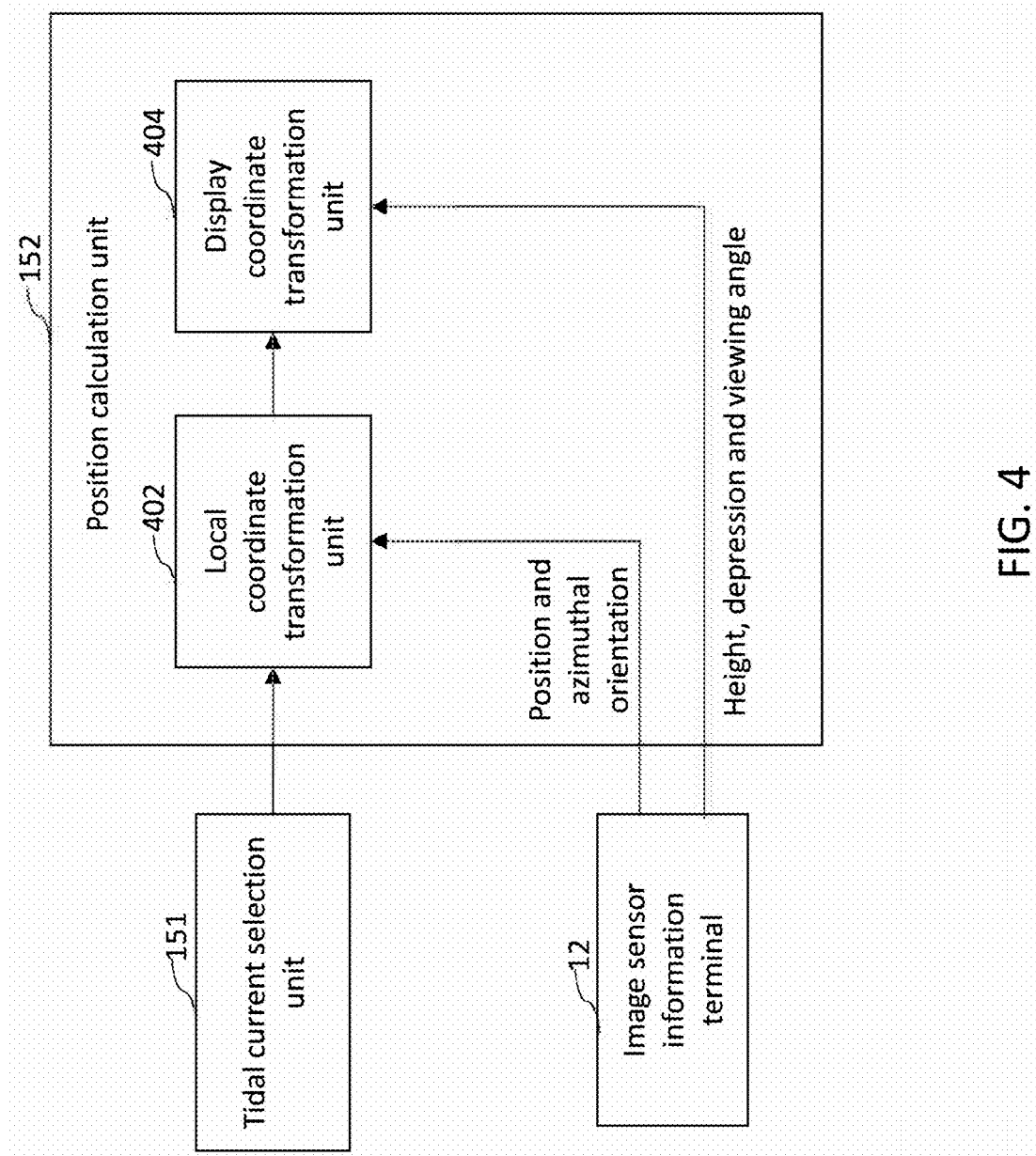
FIG. 4 is a block diagram illustrating various components of a position calculation unit of the AR based tidal current display apparatus of FIG. 1.

A configuration of the position calculation unit 152 is described in detail mainly referring to FIG. 4. The position calculation unit 152 includes a local coordinate transformation unit 402 that receives and converts chart coordinates of each selected tidal current 204 and 205 to corresponding local coordinates based on the position and the azimuthal orientation of the image sensor 10. In the context of the present disclosure, a chart coordinate is a position on the chart 200, and a local coordinate is a position in the sub-region 203 with respect to the reference axis 202 in relation to a heading direction of the movable body 11.

The position calculation unit 152 further includes a display coordinate transformation unit 404 that receives and converts local coordinates of each selected tidal current 204 and 205 to corresponding display coordinates based on the height (h) of the image sensor 10 from the water surface W, and a depression angle (α) and a viewing angle (β) of the image sensor 10. In the context of the present disclosure, a display coordinate corresponds to a display position on the display screen 17. Thus, the position calculation unit 152 receives the chart coordinates of the tidal currents 204 and 205 in the chart 200, and generates corresponding display coordinates for displaying on the display screen 17.

Additionally, or optionally, the local coordinate transformation unit 402 receives a direction and a speed of each selected tidal current 204 and 205 from the tidal current selection unit 151, and determines a direction and a speed associated with each tidal current 204 and 205 in the sub-region 203 based on the position and the azimuthal orientation of the image sensor 10. As illustrated with reference to FIG. 2A, the direction of the tidal currents 204 and 205 in the chart 200 is with respect to a global reference axis, and the direction of the tidal currents 204 and 205 in the sub-region 203 is with respect to the reference axis 202 in relation to the heading direction of the movable body 11.

Based on the direction and speed associated with each selected tidal current 204 and 205 in the sub-region 203, the display coordinate transformation unit 404 calculates, for example, using mathematical and/or graphical transformations, the direction and speed of each selected tidal current 204 and 205 on the display screen 17 based on the height h of the image sensor 10 from the water surface W, a depression angle α and a viewing angle β of the image sensor 10. Thus, the position calculation unit 152 receives the direction of the tidal currents 204 and 205 with respect to the chart 200, and generate direction information of the tidal currents 204 and 205 for displaying on the display screen 17.

Figure 5B:
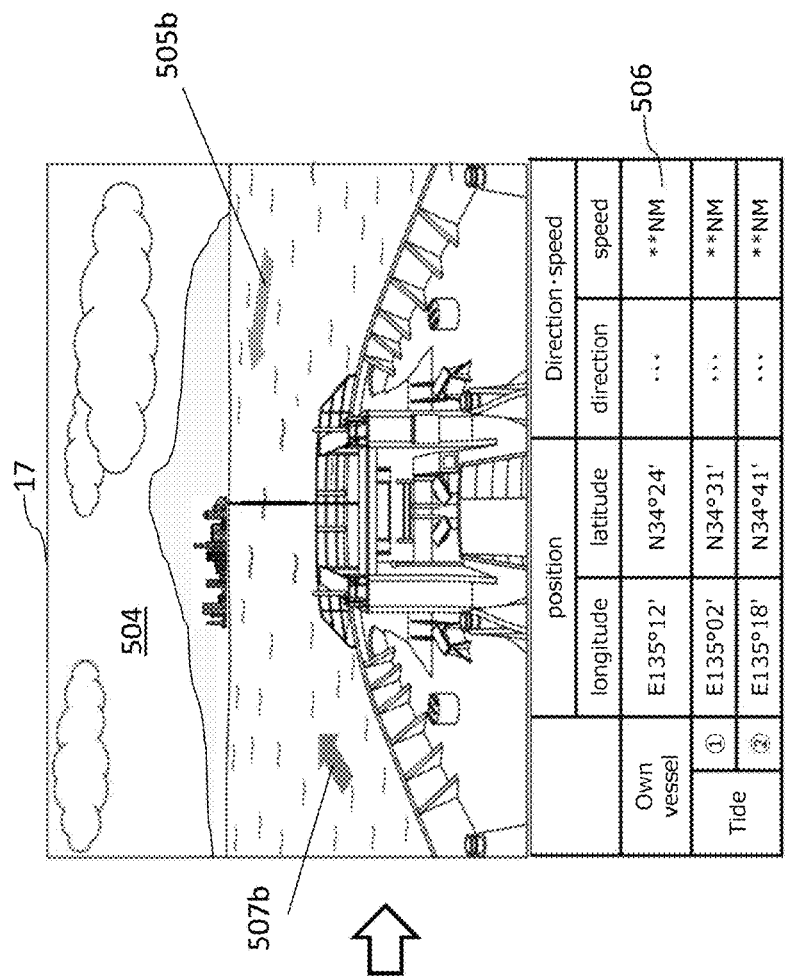
FIG. 5B illustrates a superimposed image generated by superimposing the symbols on the image generated by the image sensor.
Figure 5A:
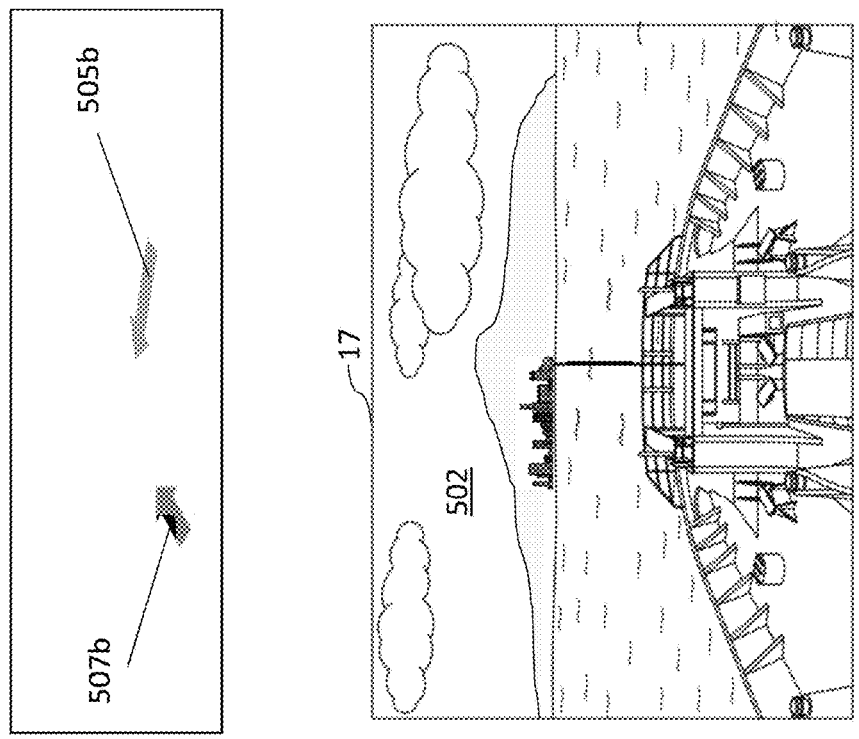
FIG. 5A illustrates an image captured by the image sensor, and symbols to be superimposed on the image.

Referring to FIGS. 1, 5A and 5B, the tidal current information superimposition unit 153 generates symbols 505b and 507b to indicate position and direction of respective tidal currents on an image 502 displayed on the display screen 17, based on information generated by the position calculation unit 152. The tidal current information superimposition unit 153 further superimposes the symbols 505b and 507b on the image 502 to generate a superimposed image 504 to indicate positions and directions of respective tidal currents in the superimposed image 504. The symbols 505b and 507b may be configured, for example, in the shape of an arrow having an arrowhead to indicate a direction of the corresponding tidal current.

Additionally, or optionally, a length of the arrow, a thickness of the arrow, and a color of the arrow in the superimposed image 504 may be varied based on a current speed of the corresponding tidal current. For instance, to indicate a weak (slow-speed) tidal current on the image, a short or thin sized arrow may be used. Further, such arrow may be rendered with the use of a green or yellow color for superimposing on the image 502. Alternatively, to indicate a strong (high-speed) tidal current on the image, a long or thick sized arrow may be superimposed on the image 502. Additionally, or optionally, the long and/or thick sized arrow may be further rendered graphically on the image 502 with the use of, for example, a red color. Additionally, the tidal current superimposition unit 153 may generate the symbols 505b and 507b based on, and to indicate, depths of respective tidal currents.

With respect to the foregoing explanation of the symbols, the characteristics of the symbols 505b and 507b are not limited to any specific shape, size, or color. These characteristics, that is, the shapes, sizes, and colors may be varied to suit one or more maritime code requirements and/or other application specific requirements.

Further, when displaying the symbols 505b and 507b superimposedly on the image 502, the limited display area of the display screen 17 can be effectively utilized by simultaneously displaying additional information 506 including tabulation of directions and speeds. Optionally, the positions of the symbols 505b and 507b may be changed, as required, or even removed from the superimposed image 504 so that the graphics pertaining to the image 504 are not obscured, or hidden, by the symbols 505b and 507b as much as possible.

Additionally, the tidal current information superimposition unit 153 generates the symbols 505b and 507b parallel to the water surface W, indicating the direction and speed of corresponding tidal current based on the depression angle α of the image sensor 10. Referring to FIG. 5C, the symbols 505b and 507b may be generated parallel to the water surface W based on transformation of two dimensional symbols 505c and 507c into corresponding three dimensional symbols 505b and 507b respectively.

Moreover, the symbols 505b and 507b may be displayed so as to incline according to the declination or depression angle β of the camera 10. By displaying in such a way, graphics pertaining to the water surface W can be obtained from image sensor 10 and such graphics is always available for visual observation by the user and for the superimposition of the symbols 505b and 507b when needed even when, for example, the hull and the image sensor 10 incline with respect to the water surface W.

Figure 5E:
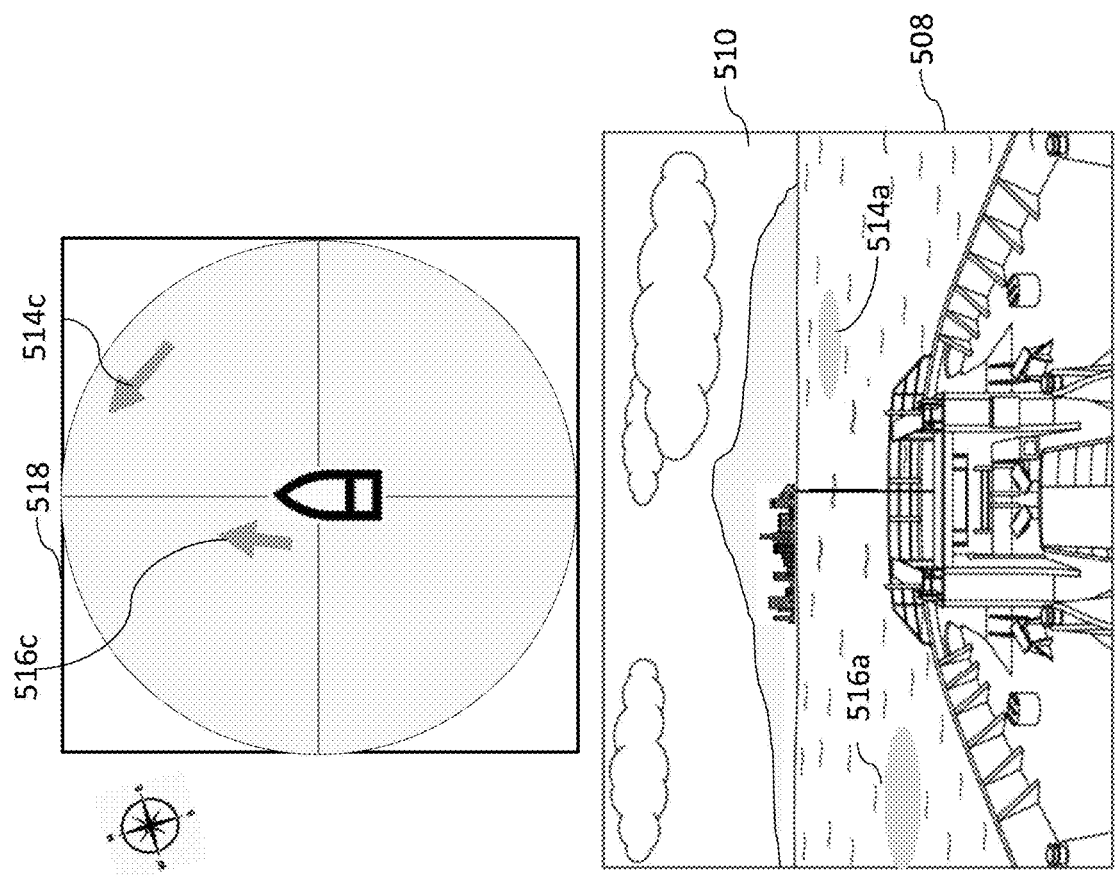
FIG. 5E illustrates the display screen that displays the superimposed image for indicating positions of tidal currents, and an external display screen for indicating directions of tidal currents.
Figure 5D:
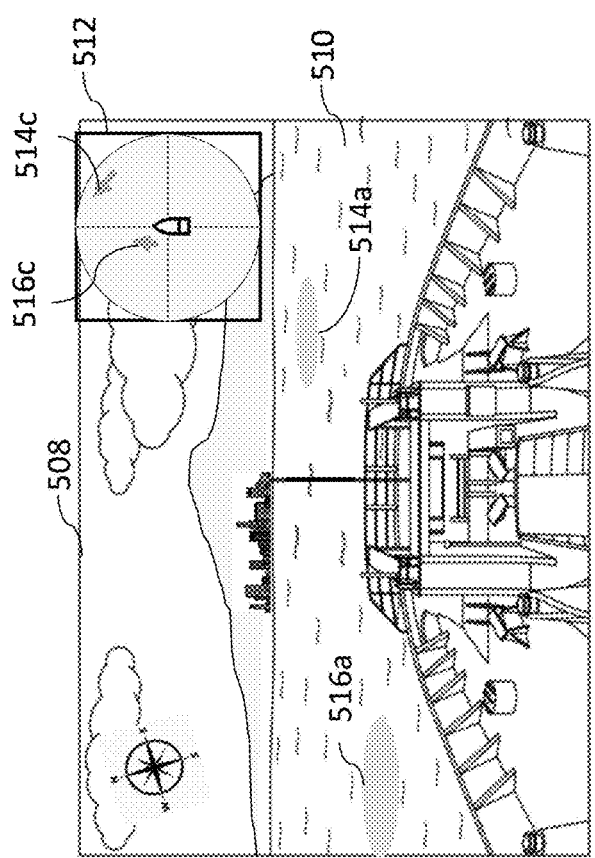
FIG. 5D illustrates a display screen that displays a superimposed image for indicating positions of one or more tidal currents, and a sub-display for indicating directions of respective tidal currents.

FIG. 5D illustrates a display screen 508 that displays a superimposed image 510 for indicating positions of one or more tidal currents, and a sub-display 512 for indicating directions of tidal currents whose position is shown in the superimposed image 510. The sub-display 512 has a reference axis in relation to the heading direction of the movable body 11.

The superimposed image 510 includes symbols 514a and 516a (similar to the symbols 204a and 205a) for indicating positions of one or more tidal currents on an image captured by the image sensor 10. The sub-display 512 displays two-dimensional symbols 514c and 516c (similar to the symbols 505c and 507c) for indicating directions of tidal currents corresponding to symbols 514a and 516a of the superimposed image 510. The symbols 514a, 516a, and 514c and 516c are generated by the tidal current superimposition unit 153. The superimposed image 510 and the sub-display 512 are synchronous in time with respect to each other. A change in the superimposed image 510 is reflected in the sub-display 512 as well.

FIG. 5E illustrates the display screen 508 that displays the superimposed image 510 for indicating positions of one or more tidal currents, and an external display screen 518 for indicating directions of tidal currents whose position is shown in the superimposed image 510. The external display screen 518 has a reference axis in relation to the heading direction of the movable body 11.

The superimposed image 510 includes symbols 514a and 516a (similar to the symbols 204a and 205a) for indicating positions of one or more tidal currents on an image captured by the image sensor 10. The external screen 518 displays two-dimensional symbols 514c and 516c (similar to the symbols 204c and 205c) for indicating directions of tidal currents corresponding to symbols 514a and 516a of the superimposed image 510. The symbols 514a, 516a, 514c and 516c are generated by the tidal current superimposition unit 153. The contents displayed on the display screen 508 and the external display screen 518 are synchronous in time with respect to each other.

Additionally, or optionally, the position calculation unit 152 may also predict future positions of one or more tidal currents displayed on an image captured by the image sensor. Accordingly, the tidal current information superimposition unit 153 may also generate the symbols to correspond with the predicted future positions and superimpose the generated symbols on the image for displaying on the display screen 17.

The ship instruments (information source of the additional display information) connected to the display apparatus 1 is not limited to what is described in FIG. 1, and other ship instruments may be included.

Further, the present disclosure is applicable not only to the ship which travels on the sea, but may also be applicable to arbitrary water-surface movable bodies which can travel, for example, the sea, a lake, or a river.

Figure 6:
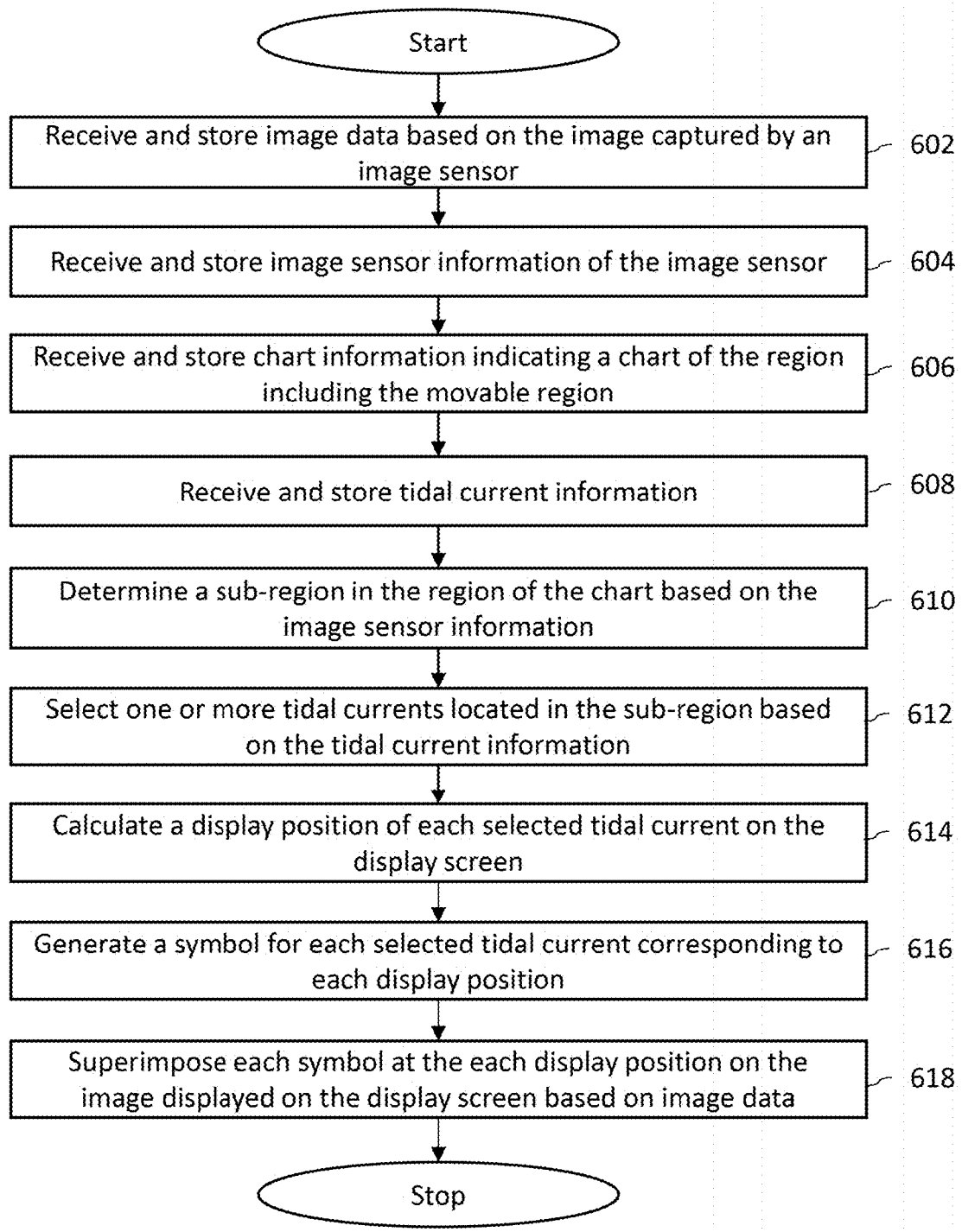
FIG. 6 is a flowchart illustrating a method for superimposing tidal current information on an image displayed on a display screen, in accordance with an embodiment of the present disclosure.

FIG. 6 is a flowchart illustrating a method for superimposing tidal current information on an image displayed on the display screen 17, in accordance with an embodiment of the present disclosure.

At step 602, image data based on the image captured by an image sensor 10 is received and stored by the image information terminal 16.

At step 604, image sensor information including a position and an azimuthal orientation of the image sensor 10 attached to the movable body 11 on a water surface (W) is received and stored in the image sensor information terminal 12.

At step 606, chart information indicating a chart 200 of the region 201 including the movable body 11 is received and stored in the chart information terminal 13.

At step 608, tidal current information pertaining to one or more locations in the chart 200 is received and stored in the tidal current information terminal 14.

At step 610, the tidal current selection unit 151 determines a sub-region 203 in the region 201 of the chart 200 based on the image sensor information.

At step 612, the tidal current selection unit 151 selects one or more tidal currents 204 and 205 located in the sub-region 203 based on the tidal current information.

At step 614, the position calculation unit 152 calculates a display position of each selected tidal current on the display screen 17 based on the tidal current information and the image sensor information.

At step 616, the tidal current superimposition unit 153 generates a symbol for each selected tidal current corresponding to each display position.

At step 618, the tidal current superimposition unit 153 superimposes each symbol at the each display position on the image displayed on the display screen 17 based on the image data.

DESCRIPTION OF REFERENCE CHARACTERS

1 Tidal current display apparatus
10 Camera (Image sensor)
11 Ship (Movable body)
12 Image sensor information terminal
13 Chart information terminal
14 Tidal current information terminal
15 Processing circuitry
16 Image information terminal
17 Display screen
W Water surface
151 Tidal current selection unit
152 Position calculation unit
153 Tidal current information superimposition unit
200 Chart
201 Region including the movable body
202 Reference axis of sub-region
203 Sub-region of chart
204 One tidal current
205 Another tidal current
204a Symbol for indicating position of one tidal current
205a Symbol for indicating position of another tidal current
206, 502 Image captured by the image sensor
402 Local coordinate transformation unit
404 Display coordinate transformation unit
504 Superimposed image
505b Symbol for indicating direction of one tidal current
506 Additional information
507b Symbol for indicating direction of another tidal current
505c Two-dimensional symbol for indicating direction of one tidal current
507c Two-dimensional symbol for indicating direction of another tidal current
508 Display screen
510 Superimposed image
512 Sub-display
514a Symbol indicating position of tidal current
516a Symbol indicating position of another tidal current
514c Symbol indicating direction of tidal current
516c Symbol indicating direction of tidal current
518 External display screen Many modifications and modifications can be added to the embodiments described above, and their elements should be understood as being among other acceptable examples. All such modifications and modifications are intended to be included within the scope of the present disclosure and are protected by the following claims.

What is claimed is:

1. An augmented reality (AR) based tidal current display device for superimposing tidal current information on an image displayed on a display screen, comprising:
   an image information terminal configured to receive the image captured by an image sensor attached to a movable body on a water surface, and output image data for displaying on the display screen;
   an image sensor information terminal configured to receive and store image sensor information including a position and an azimuthal orientation of the image sensor;
   a tidal current information terminal configured to receive and store tidal current information including positions and directions of tidal currents on the water surface (W) obtained via communication equipment separate from the movable body; and
   processing circuitry configured to:
      for each tidal current, calculate a corresponding display position and direction of the tidal current on the display screen based on the tidal current information and the image sensor information,
      generate a symbol for each tidal current to indicate the corresponding display position and direction of the tidal current on the display screen, and
      superimpose the symbol at a respective display position at the corresponding display position on the image.

2. The AR based tidal current display device of claim 1, wherein the processing circuitry is further configured to:
   select one or more tidal currents located in a field of view of the image sensor.

3. The AR based tidal current display device of claim 1, further comprising:
   a chart information terminal configured to receive and store chart information indicating a chart of a region including the movable body, wherein
   the processing circuitry is further configured to:
      receive a chart of a region including the movable body from the chart information receiving terminal,
      determine a sub-region in the received chart based on the position and azimuthal orientation of the image sensor, wherein the sub-region has a reference axis in relation to a heading direction of the movable body, and
      select the one or more tidal currents located in the sub-region based on the tidal current information.

4. The AR based tidal current display device of claim 3, wherein the processing circuitry is further configured to:
   receive and convert chart coordinates of each selected tidal current to corresponding local coordinates based on the position and the azimuthal orientation of the image sensor, wherein a chart coordinate is a position on the chart, and a local coordinate is a position in the sub-region.

5. The AR based tidal current display device of claim 4, wherein the processing circuitry is further configured to:

receive and convert local coordinates of each tidal current to corresponding display coordinates based on the image sensor information, wherein a display coordinate corresponds to a display position on the display screen.

6. The AR based tidal current display device of claim 5, wherein the processing circuitry is further configured to:
receive a speed associated with each tidal current from the tidal current information terminal, and determine a direction and a speed associated with each tidal current in the sub-region based on the position and the azimuthal orientation of the image sensor; and
receive the speed of each tidal current in the sub-region, and calculate a direction of each tidal current on an image displayed on the display screen based on a height of the image sensor from the water surface, a depression angle of the image sensor, and a viewing angle of the image sensor.

7. The AR based tidal current display device of claim 1, wherein
each symbol indicates at least one of a direction and a speed of the corresponding tidal current on the image at the respective display position, and
each symbol is outputted to the display screen.

8. The AR based tidal current display device of claim 7, wherein the processing circuitry is further configured to:
output the symbol indicating the speed of each tidal current for displaying on at least one of a sub-display on the display screen, and an external display screen.

9. The AR based tidal current display device of claim 1, wherein each symbol is configured in the shape of an arrow indicating the display position and direction of the corresponding tidal current on the display screen.

10. The AR based tidal current display device of claim 9, wherein a characteristic of each symbol, including a length of the arrow, a thickness of the arrow, and a color of the arrow, on the image is varied based on a current speed of the corresponding tidal current.

11. The AR based tidal current display device of claim 1, wherein the processing circuitry is further configured to generate each symbol based on, and to indicate, a depth of the corresponding tidal current.

12. The AR based tidal current display device of claim 1, wherein the processing circuitry is further configured to:
predict one or more future display positions of one or more selected tidal currents on an image displayed on the display screen,
generate one or more symbols corresponding to the one or more predicted future positions, and
superimpose the one or more symbols on the image displayed on the display screen.

13. An augmented reality (AR) navigation apparatus, for superimposing tidal current information on an image displayed on a display screen, comprising:
an image sensor, attached onto a movable body, configured to capture the image and output image data;
an image sensor information terminal configured to receive and store image sensor information including a position and an azimuthal orientation of the image sensor attached to the movable body on a water surface;
a chart information terminal configured to receive and store chart information indicating a chart of the region including the movable body; and
a tidal current information terminal configured to receive and store tidal current information including positions and directions of tidal currents on the water surface (W) obtained via communication equipment separate from the movable body; and processing circuitry configured to:
receive and store tidal current information pertaining to one or more locations in the chart,
determine a sub-region in the region of the chart based on the image sensor information,
select one or more tidal currents located in the sub-region,
for each selected tidal current, calculate a display position and direction of the tidal current on the display screen based on the tidal current information and the image sensor information,
for each selected tidal current, generate a symbol for the tidal current corresponding to the display position and direction, and
for each selected tidal current, superimpose the symbol at the display position on the image displayed on the display screen based on the image data.

14. The AR navigation apparatus of claim 13, wherein the display screen is configured to display the image based on the image data, and display the symbols superimposed on the image.

15. The AR navigation apparatus of claim 13, wherein each symbol is configured in the shape of a circular marker indicating the display position of the corresponding tidal current on the display screen.

16. The AR navigation apparatus of claim 13, wherein the processing circuitry is further configured to:
receive a speed associated with each selected tidal current from the tidal current information terminal,
determine a direction and a speed associated with each selected tidal current in the sub-region based on the position and the azimuthal orientation of the image sensor,
receive the speed of each selected tidal current in the sub-region, and
calculate the direction of each selected tidal current on an image displayed on the display screen based on a height of the image sensor from the water surface, a depression angle of the image sensor, and a viewing angle of the image sensor.

17. The AR navigation apparatus of claim 16, wherein each symbol indicates at least one of a direction and a speed of the corresponding tidal current on the image at the corresponding display position.

18. The AR navigation apparatus of claim 17, wherein each symbol is configured in the shape of an arrow having an arrowhead indicating a direction of the corresponding tidal current, and
each symbol is displayed parallel to the water surface captured on the image, indicating the direction and speed of the corresponding tidal current based on the depression angle of the image sensor.

19. A method for superimposing tidal current information on an image displayed on a display screen, comprising:
receiving and storing image data based on the image captured by an image sensor;
receiving and storing image sensor information including a position and an azimuthal orientation of the image sensor attached to a movable body on a water surface;
receiving and storing chart information indicating a chart of the region including the movable body;
receiving and storing tidal current information, including positions and directions of tidal currents on the water surface (W), pertaining to one or more locations in the chart;
determining a sub-region in the region of the chart based on the image sensor information;

selecting one or more tidal currents located in the sub-region, based on the tidal current information;

for each selected tidal current, calculating a display position and direction of the tidal current on the display screen based on the tidal current information and the image sensor information;

for each selected tidal current, generating a symbol for the tidal current corresponding to the display position and direction; and for each selected tidal current, superimposing the symbol at the display position on the image displayed on the display screen based on the image data.

20. A non-transitory computer readable medium having stored thereon computer-executable instructions which, when executed by a computer, cause the computer to:

receive and store image data based on the image captured by an image sensor;

receive and store image sensor information including a position and an azimuthal orientation of the image sensor attached to a movable body on a water surface;

receive and store chart information indicating a chart of the region including the movable body;

receive and store tidal current information, including positions and directions of tidal currents on the water surface (W), pertaining to one or more locations in the chart;

determine a sub-region in the region of the chart based on the image sensor information;

select one or more tidal currents located in the sub-region, based on the tidal current information;

for each selected tidal current, calculate a display position and direction of the tidal current on the display screen based on the tidal current information and the image sensor information;

for each selected tidal current, generate a symbol for the tidal current corresponding to the display position and direction; and for each selected tidal current, superimpose the symbol at the display position on the image displayed on the display screen based on the image data.

* * * * *